Patented Apr. 21, 1953

2,635,942

UNITED STATES PATENT OFFICE 2,635,942

DYEING MATERIALS MADE OF POLYVINYL DERIVATIVES

Ludwig Thummel, Basel, Switzerland, assignor to Sandoz, A. G., Basel, Switzerland, a Swiss firm No Drawing. Application April 20, 1950, Serial No. 157,186. In Switzerland April 27, 1949

10 Claims. (Cl. 8—34)

The present invention relates to the dyeing of materials, such as fibers, foils or fabrics, made of polyvinyl derivatives.

It is, of course, known to dye materials made of polyvinyl and/or polyvinylidene derivatives. However, the processes heretofore employed to effect such dyeing have invariably been bound up with considerable shrinking of the material. The undesirability of such a result is manifest. The embodiment of a process for dyeing materials made of polyvinyl derivatives is, by the same token, an obvious desideratum.

A primary object of the present invention is the realization of this desideratum, i. e. to make it possible to dye such materials while significantly suppressing shrinking and the concomitant deformation.

Briefly stated, it has been found that this and other objects—such as the production of colors of good fastness—can be realized by dyeing the material at a temperature within the range from 60 to 100° C. in an aqueous dispersion of a dyestuff which is insoluble or difficultly soluble in water, the said dispersion containing, in addition to 1.5 to 4 per cent by weight of a dispersing agent or emulsifying agent, at least two organic liquids—each in an amount of from 1.5 to 4 per cent by weight—one of which liquids has a swelling-compensating action on the polyvinyl material and the other of which has a swelling action thereon.

The polyvinyl derivative materials which are suitable for dyeing according to the present invention may be formed, in general, of polyvinyl chloride and/or polyvinylidene chloride and may include copolymers of these materials. By means of the present invention, it is possible to dye these materials without shrinkage or deformation of the fabrics, foils or the like taking place. While the illustrative examples which are hereinafter set forth refer broadly to "polyvinyl" yarn, fibers, etc., it will be understood that such materials may be made of or comprise any of the aforementioned materials, and specifically, for example, polyvinyl chloride, copolymers of vinyl chloride and vinyl acetate, polyvinylidene chloride, copolymers of vinyl chloride and polyvinylidene chloride, and the like.

Practically any water-insoluble dyestuff can be used in the process of the invention. Illustrative of such dyestuff are the acetate silk dyes, pigment dyes, vat dyes, vat dyes liberated from the so-called indigosols, and also the pigments obtained by coupling naphthols with diazo compounds or obtained from azo dyestuffs by treating them with metals such as copper, chromium and others, and the term "water insoluble dyestuffs" as used herein is intended to encompass all these dyes. These dyestuffs can advantageously be used in the form of a dispersion, for which purpose there can be used as solvent, dispersing agent or emulsifying agent, for example the water-soluble polyglycol ethers of higher aliphatic monohydric alcohols containing 12 to 18 carbon atoms in the molecule (as described in U. S. Patent No. 1,970,578), such as cetylpolyglycol ether; sulfo-ricinoleates; dibutyl naphthalene sulfonates; or even soap.

Illustrative of the organic liquids which have a swelling action on the polyvinyl and polyvinylidene materials and which can be used for this purpose in the dye-bath according to this invention are: methylated benzene derivatives such as toluene and xylene; aliphatic and aromatic chlorinated solvents such as methylene dichloride, ethylene dichloride, trichlorethylene, carbon tetrachloride and benzyl chloride; hydrogenated naphthalene derivatives such for example as decahydronaphthalene and tetrahydronaphthalene; higher aliphatic alcohols and the esters thereof such for example as the butanols, amyl alcohols, butyl acetate, amyl acetate, etc.

As the second liquid, i. e. the liquid which has a swelling-compensating action, that is, a non-solvent and non-swelling action, on the polyvinyl and polyvinylidene derivatives, whereby the latter are enabled to retain their physical structure when dyed in the presence of organic liquids as defined in the preceding paragraph and which have a swelling action there may be used for example: hydrogenated benzene derivatives such as cyclohexanol and methylcyclohexanol, and lower aliphatic alcohols and their derivatives such as methanol, ethanol, isopropyl alcohol, aldehydes such as formaldehyde and acetaldehyde, amines such as mono-, di- and triethanolamine, and polyvalent alcohols and their derivatives such as glycol, glycerine, ethyl glycol, butyl glycol and the like.

The combination of the two liquids, together with the dispersing or emulsifying agent, makes it possible to control the dyeing and shrinking of the polyvinyl derivatives in a manner which has not heretofore been possible with known dyeing procedures. Certain materials, such as the mixture of polyvinyl acetate and chloride, can be dyed even near the boiling point without or with only a feeble shrinking or altering.

The following examples illustrate the invention, the parts being by weight unless otherwise stated, and the relation between parts by weight and parts by volume being the same as that between the gram and the cubic centimeter. The temperatures are in degrees centigrade. The dyestuffs used in these examples are identified by their numbers in the Colour Index or in the 1952 Technical Manual and Year Book of the American Association of Textile Chemists and Colorists or by their chemical name or structure.

Example 1

10 parts of an emulsion consisting of 30 parts of a water-soluble polyglycol ether of the monohydric alcohol containing 13 carbon atoms (tridecyl alcohol), 35 parts of tetrahydronaphthalene, 35 parts of methylcyclohexanol and 3 parts of the cellulose acetate dyestuff No. 499 (Col. Ind.) are dispersed in 200 parts by volume of water, and 5 parts of polyvinyl fibers are dyed in this dye-bath for 3/4 hour at 90°. Diazotization and development with β-hydroxynaphthoic acid ensues in the usual way. A fast deep black coloration is obtained with no shrinkage or deformation of the fibers.

Example 2

5 parts of an emulsion consisting of 30 parts of a water-soluble cetylpolyglycol ether, 30 parts of trichlorethylene, 25 parts of cyclohexanol and 3 parts of a fine suspension of the pigment azo-dyestuff prepared by coupling p-nitraniline with acetoacetyl-anilide are dispersed in 100 parts by volume of water, and 2.5 parts of polyvinyl fibers are dyed therein for 1/2 hour at 70°. A beautiful fast yellow dyeing is obtained with no shrinkage or deformation of the fibers.

Example 3

5 parts of an emulsion of 30 parts of the polyglycol ether of Example 1 of U. S. Pat. No. 1,970,578, 35 parts of tetrahydronaphthalene, 35 parts of cyclohexanol and 3 parts of the sulfuric acid ester of the vat dyestuff No. 1101 (Col. Ind.) are dispersed in 100 parts by volume of water and after the addition of 0.2 part of sodium nitrite, 2.5 parts of polyvinyl yarn are dyed therein for 3/4 hour at 90°. Development ensues by the addition of 2 parts of 1-normal sulphuric acid within 15 minutes at 40°. The dyed yarn is thereupon rinsed and soaped. A fast beautiful green dyeing is obtained with no shrinkage or deformation of the fibers.

Example 4

10 parts of an emulsion consisting of 30 parts of sodium sulforicinoleate, 30 parts of ethylene dichloride, 30 parts of cyclohexanol and 2 parts of the stabilized mixture of naphthol bases, Prototype No. 336 (AATCC manual) are dispersed in 100 parts by volume of water. 2.5 parts of polyvinyl yarn are introduced into this bath at 40° and dyed for 3/4 hour while slowly increasing the temperature to 80°. After rinsing and soaping, a fine red dyeing is obtained. No shrinkage or deformation is perceptible.

Example 5

5 parts of an emulsion consisting of 30 parts of dibutyl naphthalene sulfonate, 35 parts of tetrahydronaphthalene, 35 parts of methylcyclohexanol and 3 parts of the vat dyestuff No. 1101 (Col. Ind.) are dispersed in 100 parts by volume of water. 2.5 parts of polyvinyl fibers are dyed in this dye-bath for 1/2 hour at 80°. To this dye-bath there are then added 0.2 part of caustic soda lye of 36° Bé. and 0.2 part of sodium hydrosulphite, and the bath maintained at this temperature for another 20 minutes. After re-oxidation and soaping, a bright bluish-green dyeing is obtained. No shrinking or deformation is perceptible.

Example 6

1 part of an emulsion consisting of 40 parts of the polyglycol ether of Example 17 of U. S. Pat. No. 1,970,578, 10 parts of tetrahydronaphthalene, 50 parts of methylcyclohexanol and 3 parts of the cellulose acetate dyestuff Prototype No. 62 (AATCC Manual) are dispersed in 200 parts by volume of water. 5 parts of polyvinyl fibers are now dyed in this dye-bath for 3/4 hour at 65°. A beautiful blue dyeing is obtained without any shrinkage of the material.

Example 7

5 parts of an emulsion consisting of 30 parts of the emulsifier used in Example 2, 35 parts of ethylene chloride, 35 parts of triethanolamine and 3 parts of 1,4-diamino-anthraquinone are dispersed in 200 parts by volume of water. 5 parts of polyvinyl foil is dyed in this dye-bath for 1/2 hour at 80°. A bright fast violet dyeing is obtained without any shrinkage of the material.

As will be evident from the preceding illustrative examples, it is preferred to employ about 5 to about 10 parts of assistant (emulsion) in 100 parts of dye-bath. The emulsion itself preferably consists of 25 to 40% (optimally about 30%) of emulsifier, 25 to 40% (optimally about 35%) of swelling agent, and 25 to 40% (optimally about 35%) of swelling-compensating liquid.

Having thus disclosed the invention, what is claimed is:

1. A method of coloring material comprising a member selected from the group consisting of polyvinyl and polyvinylidene chlorides and copolymerized vinyl and vinylidene chlorides without shrinkage or deformation of the material, which comprises dyeing the said material at a temperature of 60 to 100° C. in an aqueous dispersion of a substantially water-insoluble dyestuff, the said dispersion containing, in addition to a member selected from the group consisting of dispersing and emulsifying agents, about 1.5 to about 4% by weight of each of at least two organic liquids, one of which has a swelling action on said material and is selected from the group consisting of chlorinated ethylenes and hydrogenated naphthalenes, and the other of which has a swelling-compensating action on said material and is selected from the group consisting of cyclohexanol, methylcyclohexanol and triethanolamine.

2. A method of coloring polyvinyl chloride fibers without shrinkage or deformation, which comprises dyeing the fibers at a temperature of 60 to 100° C. in an aqueous dispersion of a water insoluble azo pigment dyestuff, the said dispersion containing, in addition to a water-soluble cetyl poly glycol ether as dispersing and emulsifying agent, about 1.5 to about 4% by weight of methylcyclohexanol having a swelling-compensating action on the polyvinyl chloride fibers, and about 1.5 to about 4% by weight of tetrahydronaphthalene having a swelling action on said polyvinyl chloride fibers.

3. A method of coloring polyvinyl chloride fibers without shrinkage or deformation, which comprises dyeing the fibers at a temperature of 60 to 100° C. in an aqueous dispersion of a vat dyestuff, the said dispersion containing, in addition to a water-soluble cetyl poly glycol ether as dispersing and emulsifying agent, about 1.5 to about 4% by weight of methylcyclohexanol having a swelling-compensating action on the polyvinyl chloride fibers, and about 1.5 to about 4% by weight of tetrahydronaphthalene having a swelling action on said polyvinyl chloride fibers.

4. A method of coloring polyvinyl chloride fibers without shrinkage or deformation, which comprises dyeing the fibers at a temperature of 60 to 100° C. in an aqueous dispersion of an acetate silk dye, the said dispersion containing, in addition to a water-soluble cetyl poly glycol ether as dispersing and emulsifying agent, about 1.5 to about 4% by weight of methylcyclohexanol having a swelling-compensating action on the polyvinyl chloride fibers, and about 1.5 to about 4% by weight of tetrahydronaphthalene having a swelling action on said polyvinyl chloride fibers.

5. A method of coloring polyvinyl chloride fibers without shrinkage or deformation, which comprises dyeing the fibers at a temperature of 60 to 100° C. in an aqueous dispersion of a pigment obtained by coupling naphthols with diazo compounds, the said dispersion containing, in addition to a water-soluble cetyl poly glycol ether as dispersing and emulsifying agent, about 1.5 to about 4% by weight of methylcyclohexanol having a swelling-compensating action on the polyvinyl chloride fibers, and about 1.5 to about 4% by weight of tetrahydronaphthalene having a swelling action on said polyvinyl chloride fibers.

6. A dye-bath for use in coloring material comprising a member selected from the group consisting of polyvinyl and polyvinylidene chlorides and copolymerized vinyl and vinylidene chlorides, said dye-bath consisting of an aqueous dispersion of a substantially water-insoluble dyestuff, the said dispersion containing, in addition to a member selected from the group consisting of dispersing and emulsifying agents, about 1.5 to about 4% by weight of each of at least two organic liquids, one of which has a swelling action on said material and is selected from the group consisting of chlorinated ethylenes and hydrogenated naphthalenes and the other of which has a swelling-compensating action on said material and is selected from the group consisting of cyclohexanol, methylcyclohexanol and triethanolamine.

7. A dye-bath consisting of an aqueous dispersion of a water insoluble azo pigment dyestuff, the said dispersion containing, in addition to a water-soluble cetylpolyglycol ether as dispersing and emulsifying agent, about 1.5 to about 4% by weight of methylcyclohexanol having a swelling-compensating action on polyvinylchloride fibers, and about 1.5 to about 4% by weight of tetrahydronaphthalene having a swelling action on the said polyvinyl chloride fibers.

8. A dye-bath consisting of an aqueous dispersion of a vat dyestuff, the said dispersion containing, in addition to a water soluble cetylpolyglycol ether as dispersing and emulsifying agent, about 1.5 to about 4% by weight of methylcyclohexanol having a swelling-compensating action on polyvinychloride fibers, and about 1.5 to about 4% by weight of tetrahydronaphthalene having a swelling action on the said polyvinyl chloride fibers.

9. A dye-bath consisting of an aqueous dispersion of an acetate silk dye, the said dispersion containing, in addition to a water soluble cetylpolyglycol ether as dispersing and emulsifying agent, about 1.5 to about 4% by weight of methylcyclohexanol having a swelling-compensating action on polyvinylchloride fibers, and about 1.5 to about 4% by weight of tetrahydronaphthalene having a swelling action on the said polyvinyl chloride fibers.

10. A dye-bath consisting of an aqueous dispersion of a pigment obtained by coupling naphthols with diazo compounds, the said dispersion containing, in addition to a water soluble cetylpolyglycol ether as dispersing and emulsifying agent, about 1.5 to about 4% by weight of methylcyclohexanol having a swelling-compensating action on polyvinylchloride fibers, and about 1.5 to about 4% by weight of tetrahydronaphthalene having a swelling action on the said polyvinyl chloride fibers.

LUDWIG THUMMEL.

References Cited in the file of this patent

UNITED STATES PATENTS

| Number | Name | Date |
|---|---|---|
| 2,161,766 | Rugeley | June 6, 1939 |
| 2,260,543 | Smith | Oct. 28, 1941 |
| 2,394,689 | Heymann | Feb. 12, 1946 |

FOREIGN PATENTS

| Number | Country | Date |
|---|---|---|
| 568,037 | Great Britain | Mar. 15, 1945 |

OTHER REFERENCES

American Dyestuff Reporter for April 22, 1946, pages P194 to P197 inclusive, P204, 205. Article by J. A. Woodruff.